United States Patent
Fischer et al.

(10) Patent No.: US 7,401,245 B2
(45) Date of Patent: Jul. 15, 2008

(54) COUNT CALIBRATION FOR SYNCHRONOUS DATA TRANSFER BETWEEN CLOCK DOMAINS

(75) Inventors: Timothy C. Fischer, Firestone, CO (US); Samuel Naffziger, Fort Collins, CO (US); Benjamin J. Patella, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 298 days.

(21) Appl. No.: 11/118,600

(22) Filed: Apr. 29, 2005

(65) Prior Publication Data

US 2006/0248367 A1 Nov. 2, 2006

(51) Int. Cl.
G06F 1/12 (2006.01)
G06F 1/04 (2006.01)
G06F 13/42 (2006.01)
G06F 1/06 (2006.01)

(52) U.S. Cl. ...................... 713/401; 713/600
(58) Field of Classification Search ................ 713/401, 713/600
See application file for complete search history.

(56) References Cited

U.S. PATENT DOCUMENTS

| 5,487,097 | A | 1/1996 | Jordan et al. |
| 6,549,596 | B1 | 4/2003 | Cretti et al. |
| 6,574,380 | B2 | 6/2003 | Ranalli |
| 6,898,682 | B2* | 5/2005 | Welker et al. ............... 711/163 |
| 7,110,423 | B1 | 9/2006 | Sethuram et al. |
| 2003/0123588 | A1 | 7/2003 | Parikh |
| 2004/0044919 | A1* | 3/2004 | Dabral ...................... 713/400 |
| 2004/0062137 | A1* | 4/2004 | Phan et al. ................. 365/233 |
| 2004/0225977 | A1 | 11/2004 | Akkerman |
| 2006/0020843 | A1* | 1/2006 | Frodsham et al. ........... 713/503 |
| 2006/0091912 | A1 | 5/2006 | Ghosh et al. |
| 2006/0236180 | A1* | 10/2006 | Ong ........................... 714/731 |
| 2007/0255919 | A1 | 11/2007 | Ware et al. |
| 2008/0004831 | A1 | 1/2008 | Li |

* cited by examiner

*Primary Examiner*—Thomas Lee
*Assistant Examiner*—Michael Wang

(57) ABSTRACT

Systems and methods for implementing count calibration for synchronous data transfer between clock domains are disclosed. An exemplary system may include a count calibration circuit for determining latency between an early clock domain and a late clock domain. The system may also include a data path configurable for synchronous data transfer between clock domains based at least in part on the latency.

17 Claims, 5 Drawing Sheets

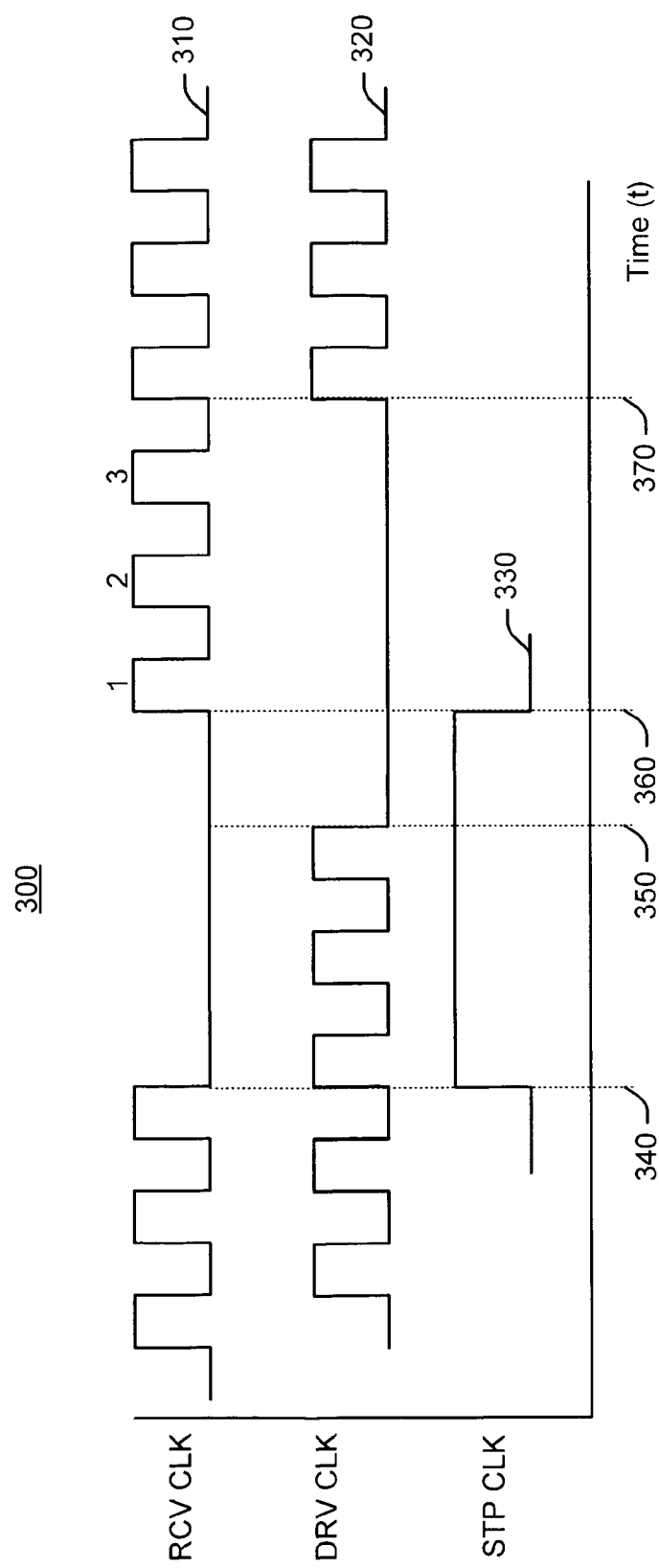

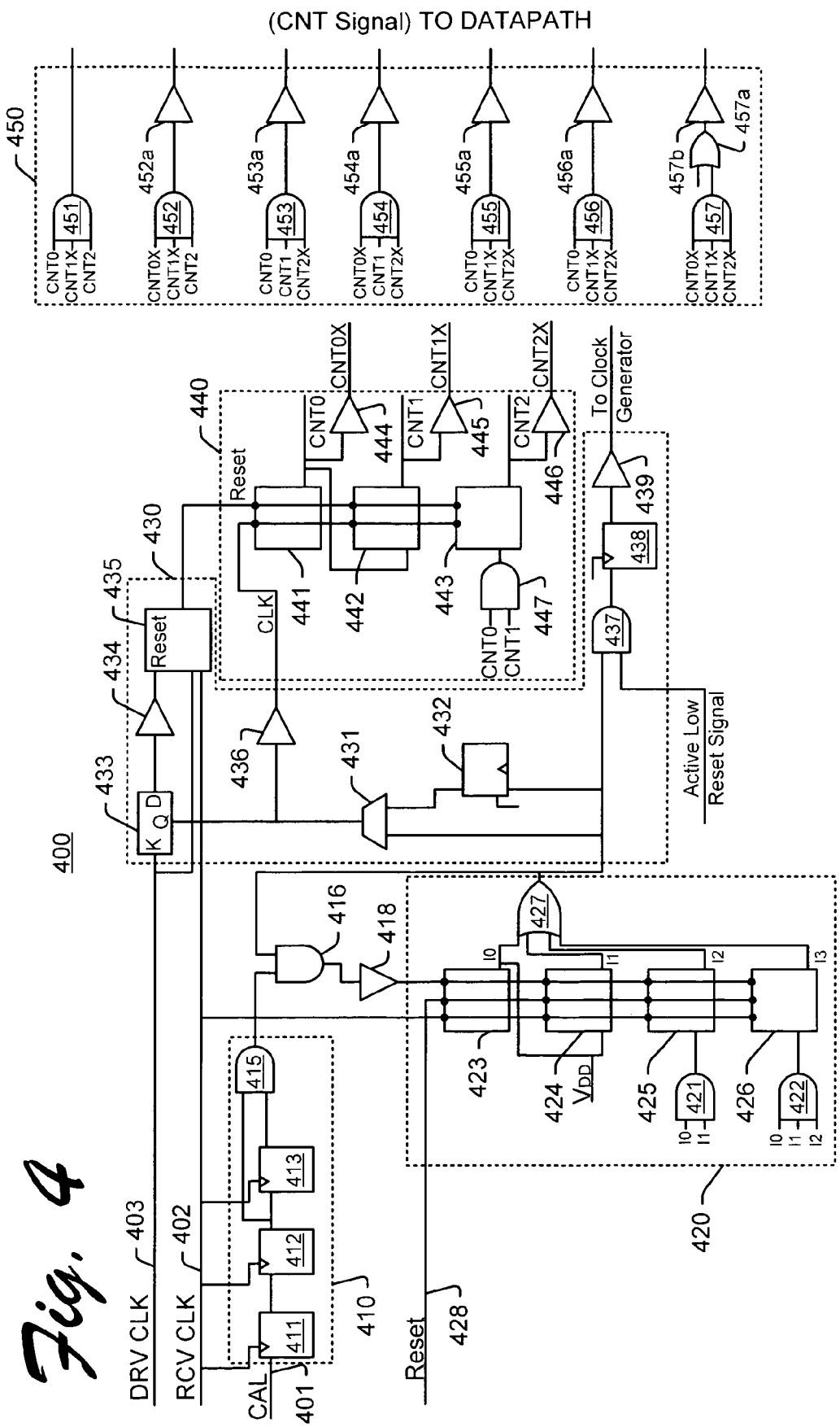

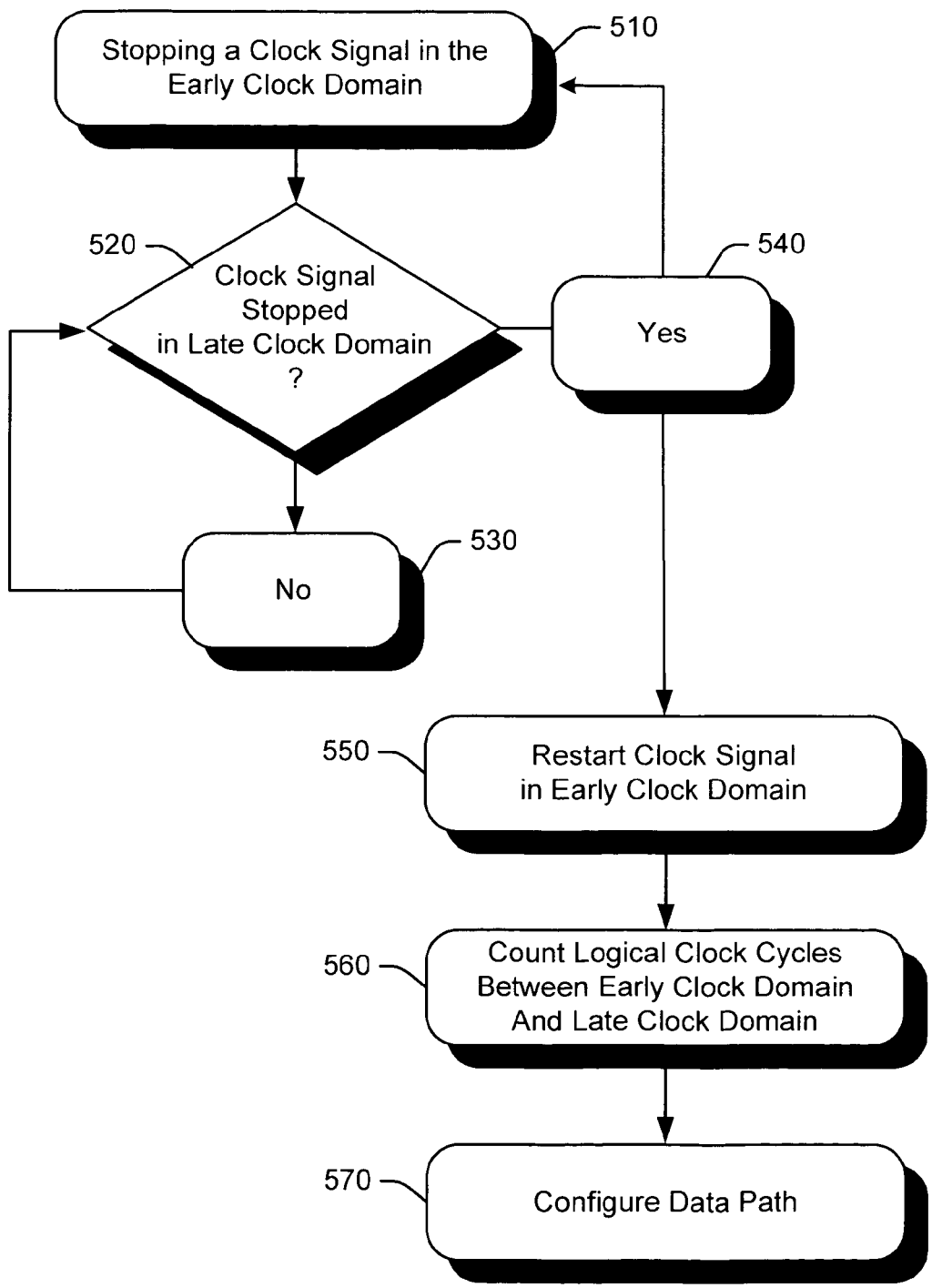

COUNT CALIBRATION FOR SYNCHRONOUS DATA TRANSFER BETWEEN CLOCK DOMAINS

RELATED APPLICATIONS

This application contains subject matter related to co-owned U.S. patent application for "Configurable Data Path For Synchronous Data Transfer Between Clock Domains" of Fischer, et al. Ser. No. 11/118,632, and co-owned U.S. patent application for "Edge Calibration For Synchronous Data Transfer Between Clock Domains" of Fischer, et al. Ser. No. 11/118,740, each filed on the same day and hereby incorporated herein for all that is disclosed.

TECHNICAL FIELD

The described subject matter relates to synchronous data transfer, and more particularly to count calibration for synchronous data transfer between clock domains.

BACKGROUND

Synchronous digital circuits (e.g., microprocessors) use internal clock signals to control operation sequences and timing of events. Some digital systems implement multiple clock domains in which the clock frequency in each domain is the same and skew within each domain is tightly controlled. However, skew between clock domains may negatively impact setup and hold constraints, resulting in non-determinism for signals crossing between domains. This skew between clock domains is magnified at higher frequencies.

Although asynchronous circuit design may be implemented where the magnitude of skew between clock domains is not known or cannot be held within acceptable bounds, synchronous circuit design is generally preferred for enhanced performance, deterministic data transfer, and more predictable behavior. Synchronous circuit designs typically employ a delay line, commonly referred to as a "salmon ladder," to transfer data synchronously between clock domains. The delay line includes delay components which match the source clock on one end of the delay line and increase in increments to match the sink clock on the other end of the delay line.

Delay lines, however, are typically matched to the source and sink clocks during design and do not account for various processing speeds, supply voltage effects, temperature effects, and frequency conditions during operation. In addition, the delay line may be constructed with different types of metal, field-effect transistors (FETs), and/or resistor-capacitor (R-C) components from what is used in the actual signal path. Any one or more of these factors may result in non-determinism, even in synchronous circuit designs which implement delay lines.

SUMMARY

An exemplary embodiment of synchronous data transfer between clock domains may include a system. The system may comprise: a count calibration circuit for determining latency between an early clock domain and a late clock domain, and a data path configurable for synchronous data transfer between clock domains based at least in part on the latency.

In another exemplary embodiment, synchronous data transfer between clock domains may be implemented as a method. The method may comprise: determining latency between an early clock domain a late clock domain, and configuring a data path for synchronous data transfer between clock domains based a least in part on the latency.

BRIEF DESCRIPTION OF THE DRAWINGS

FIG. 3 is an exemplary waveform diagram illustrating signal stop and count operations.

FIG. 4 is a schematic diagram illustrating an exemplary clock calibration circuit.

FIG. 5 is a flowchart illustrating exemplary operations to implement count calibration for synchronous data transfer between clock domains.

DETAILED DESCRIPTION

Systems and methods described herein may be implemented in a configurable data path for synchronous data transfer between clock domains. Exemplary embodiments may include a digitally-controlled data path which is configurable or adaptable for actual operating conditions. The data path handles data transfers between clock domains and provides deterministic data transfers between clock domains with sufficient margin to handle voltage and temperature variation across the operating range.

Briefly, the data path may be calibrated by measuring alignment between the source clock edge and the sink clock edge during run-time, allowing a setup/hold margin for the transfer to be determined and increased on a dynamic (or "as-needed") basis to cover circuit delay variation caused by voltage and temperature effects on the circuit. The calibration may then be used to configure the clocking and cyclic latency for a data path and configure clocks and multiplexer selects for the data path to implement deterministic transfers between the clock domains.

Exemplary embodiments shown and described herein specify a delay line from the late clock domain to the early clock domain. However, it is noted that in other exemplary embodiments, the delay line may be implemented from the early clock domain to the late clock domain.

It is also noted that operations described herein may be implemented in logic circuitry. Exemplary logic circuitry is shown and described herein for purposes of illustration. However, the exemplary logic circuitry is not intended to be limiting. Other embodiments, including software implementations, will also be readily apparent to those having ordinary skill in the art after having become familiar with the teachings herein.

Exemplary System

Figure 1:
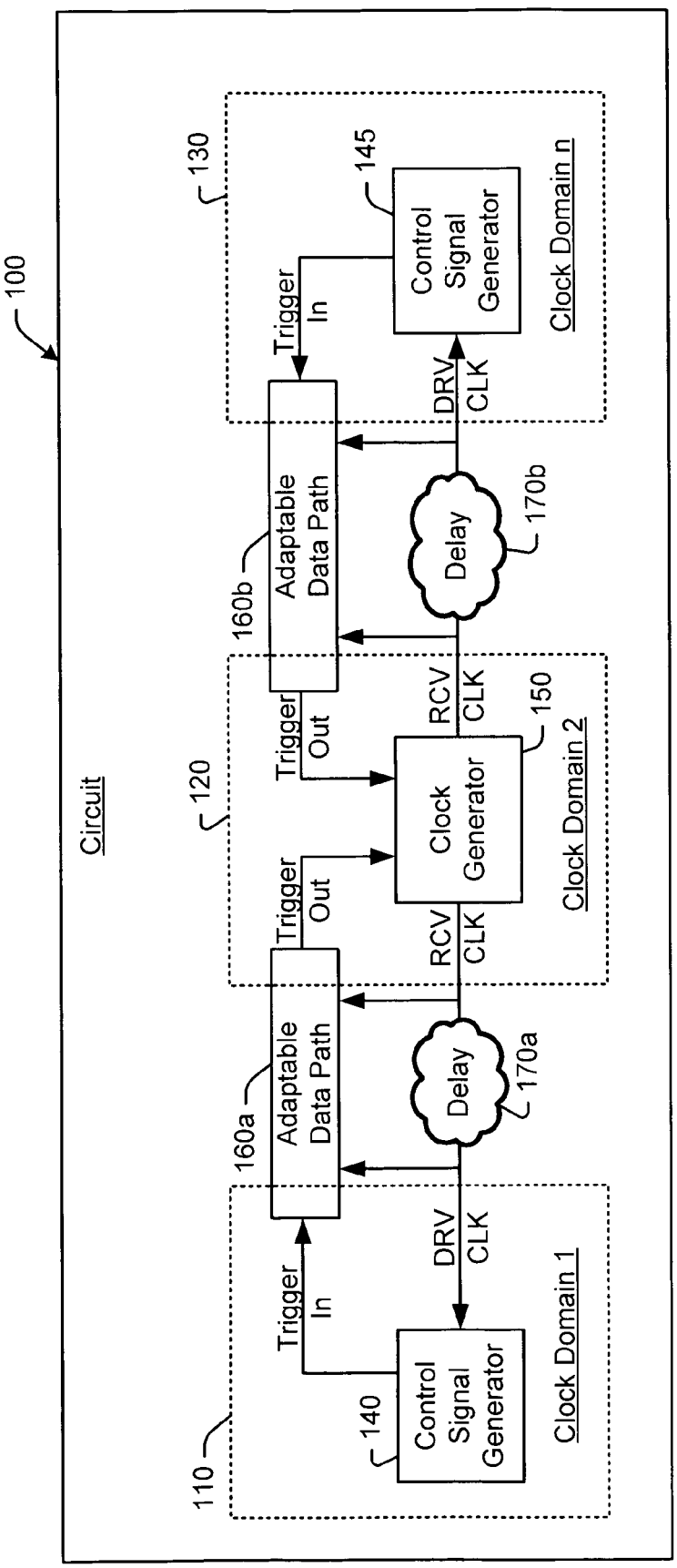
FIG. 1 is a high-level illustration of an exemplary circuit having a plurality of clock domains.

FIG. 1 is a high-level illustration of an exemplary circuit having a plurality of clock domains. Exemplary circuit 100 may be a circuit under test (or "test circuit"), such as, e.g., a microprocessor requiring deterministic cross-domain data transfers. For purposes of illustration, test circuit 100 is shown having a first clock domain 110, a second clock domain 120, and an nth clock domain 130. It is noted that circuits may have any number of clock domains, and the systems and methods described herein are not limited to use with circuits having any particular number of clock domains. Test circuit 100 may also include one or more control signal generators 140, 145, e.g., for generating control signals (or "trigger" signals) for test operations.

In an exemplary test operation, a clock generator 150 for the test circuit 100 may need to be stopped on a specific logical cycle, independent of frequency. For example, the clock generator 150 may need to be stopped for a serial scan of the test circuit data registers to troubleshoot a floating point error. Accordingly, control signal generator 140, 145 may issue a clock-stop signal to the clock generator 150.

The clock-stop signal may originate in a first clock domain (e.g., clock domain 110) where the control signal generator 140, 145 resides. However, the first (or "late") clock domain may be offset from a second (or "early") clock domain (e.g., clock domain 120) where the clock generator 150 resides, as illustrated by delay 170a and 170b. Because the clock generator operates over a wide range of frequencies, these clock-stop signals cross between clock domains with high frequency dependent skew components.

For purposes of illustration, the late clock domain (e.g., clock domain 110) may be at logical clock cycle 3000 when the early clock domain (e.g., clock domain 120) is at logical clock cycle 3004. Therefore, a control signal generated in the late clock domain takes no less than four logical clock cycles to arrive in the early clock domain (i.e., 3004−3000=4). Accordingly, an event generated in the late clock domain needs to be delayed by four logical clock cycles before being issued to the early clock domain so that data arrives in the early clock domain at the desired logical clock cycle.

In exemplary embodiments, the control signal may be issued from the late clock domain to the early clock domain via one or more adaptable (or configurable) data path 160a, 160b so that each clock domain receives the event (e.g., stop-clock signal) at the desired clock cycle. For example, the adaptable data path 160a, 160b may measure the difference in logical clock cycles between a receive clock (RCV CLK) signal issued by the clock generator 150, and a drive clock (DRV CLK) signal including the delay 170a between clock cycles. The adaptable data path 160a, 160b uses this measurement to adjust the control signal (or trigger-in signal) so that the control signal (or trigger-out signal) that is delivered to the early clock domain includes data (e.g., a stop-clock instruction on the desired logical clock cycle.

Before continuing, it is noted that the adaptable data path 160a, 160b adjusts for significant delay between clock domains (illustrated at 170a, 170b). Any delay between the data path 160a, 160b and the clock generator 150 is considered to be negligible, and therefore does not violate setup and hold times.

Figure 2:
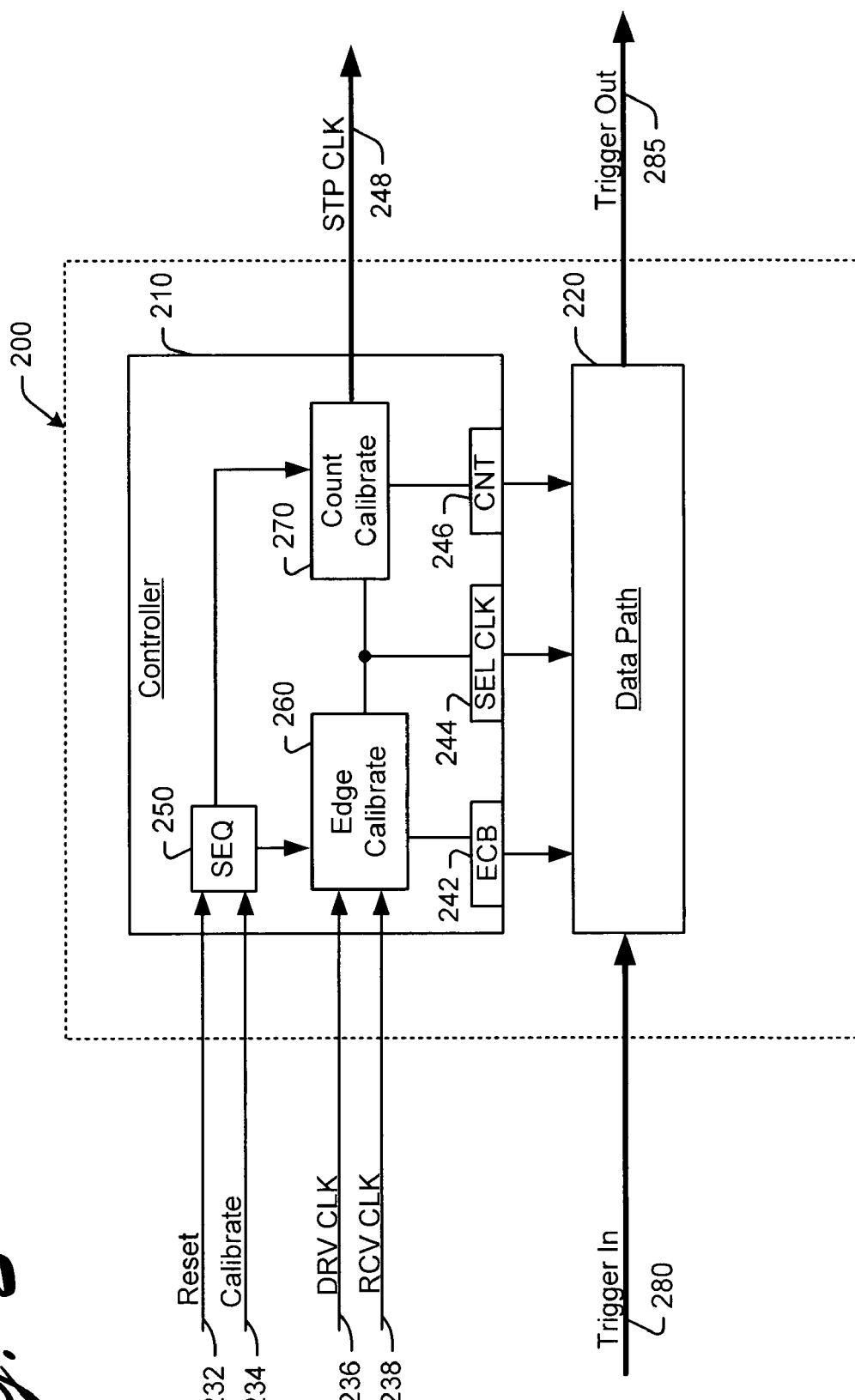
FIG. 2 is a functional block diagram of an exemplary system for synchronous data transfer between clock domains.

FIG. 2 is a functional block diagram of an exemplary system (such as adaptable data path 160a, 160b in FIG. 1) for synchronous data transfer between clock domains. Exemplary system 200 may include a controller 210 operatively associated with a data path 220. Controller 210 may be implemented to configure the data path 220 based on the latency between clock domains (e.g., clock domains 110-130 in FIG. 1) at run-time.

In an exemplary embodiment, logic functions of controller 210 and data path 220 are implemented in logic circuitry, as described in more detail below with reference to FIG. 3. Controller 210 may include inputs for receiving a reset signal 232, a calibrate (CAL) signal 234, a drive clock (DRV CLK) signal 236, and a receive clock (RCV CLK) signal 238. Controller 210 may also include outputs for issuing an edge calibration bypass (ECB) signal 242, a select clock (SEL CLK) signal 244, a count (CNT) signal 246, and a stop clock (STP CLK) signal to the data path 220.

In operation, reset signal 232 may be issued to system 200 to return it to a predictable logic state and/or clear any prior configurations, e.g., at start-up or for recalibration. A sequencer 250 in controller 210 first activates an edge calibration circuit 260, and then activates a count calibration circuit 270.

Edge calibration circuit 260 may issue a bypass signal 242 to route the trigger-in signal 280 around a delay line in the data path 220. In addition, edge calibration circuit 260 may be operated to select partial cycle (e.g., quarter cycle) sink-domain clocks for maximizing setup and hold times for transfers between clock domains. This calibration also improves the data path's tolerance of voltage and temperature variation after calibration. In an exemplary implementation where quarter cycle sink-domain clocks are selected, the minimum margin for each constraint is a quarter cycle and is sufficient to cover the delay range of clock distribution across the maximum voltage and temperature operating region of this embodiment. However, other margins may also be implemented.

Edge calibration 260 may operate in conjunction with count calibration circuit 270 to determine latency between clock domains. In an exemplary embodiment, the controller 210 may determine the latency by measuring the difference or offset in clock cycles between the drive clock (DRV CLK) signal 236 and the receive clock (RCV CLK) signal 238. In an example where the receive clock (RCV CLK) signal is at logical clock cycle 304 and the drive clock (DRV CLK) signal is at logical clock cycle 300, the latency between clock domains is 4 logical clock cycles. That is, an event generated in the first (e.g., drive) clock domain takes 4 logical clock cycles to arrive in the second (e.g., receive) clock domain.

Controller 210 issues select clock (SEL CLK) signals 244 and count (CNT) signals 246 to the data path 220 for allocating a predetermined number of cycles (N) to transfer data. In an exemplary embodiment, N is greater than the maximum expected separation (M) between clock domains. Accordingly, controller 210 may configure data path 220 to occupy M minus N cycles of latency. For example, if M is selected to be 5 logical clock cycles, and there are 2 logical clock cycles of latency, the data path may be configured to increment the delay by 3 logical clock cycles (e.g., 5−2=3).

Count calibration is described in more detail herein. Exemplary embodiments of data path and edge calibration circuits are described in more detail in the related patent applications cross-noted above. For purposes of this application, it is sufficient to understand that the edge and count calibration are used by controller 210 to configure the clocking and cyclic latency for data path 220.

Before continuing it is noted that the data path 220 may be configured at run-time so that the data path 220 is configured based on operational data for the circuit. Also in exemplary embodiments, the data path configuration may be maintained during operation, as constant recalibration may be intrusive to operation of the circuit. However, the data path 220 is adaptable and may be reconfigured, e.g., based on changes in the run-time environment.

FIG. 3 is an exemplary waveform diagram illustrating signal stop and count operations. Exemplary waveform diagram 300 shows a signal in the early clock domain (e.g., receive clock signal 310) and a signal in the late clock domain (e.g., drive clock signal 320). A stop clock signal 330 is also shown in FIG. 3.

Stop clock (STP CLK) signal 330 may be asserted by a count calibration circuit (e.g., the count calibration circuit 270 in FIG. 2) to stop the receive clock (RCV CLK) signal 310. The drive clock (DRV CLK) signal 320 also stops, but at some time (t) after the stop clock signal 330 has been asserted due to the delay between clock domains. Before continuing, it is noted that the STP CLK signal 330 is different from the clock stop signal described above with reference to FIG. 1.

After both the receive clock (RCV CLK) signal 310 and drive clock (DRV CLK) signal 320 have stopped, the count calibration circuit may restart the receive clock 310 to measure latency between clock domains. In an exemplary embodiment, the count calibration circuit counts the number of logical clock cycles on the receive (RCV CLK) signal 310 until the leading edge of drive clock (DRV CLK) signal 320 arrives.

For purposes of illustration, count calibration circuit may assert stop c lock signal 330 at time 340. The receive clock (RCV CLK) signal 310 also stops at approximately time 340. The drive clock signal 320 initially continues due to the delay between clock domains, and then stops later at some time (t) (e.g., at time 350). After both clocks have stopped (e.g., at time 360), the count calibration circuit releases the stop clock (STP CLK) signal 330 to restart the receive clock (RCV CLK) signal 310.

After restarting the receive clock (RCV CLK) signal 310, count calibration circuit determines the latency between the early domain and late domain by "counting" the logical clock cycles on the receive clock (RCV CLK) signal 310 before the drive clock (DRV CLK) signal 320 arrives (e.g., at time 370). In FIG. 3, for example, the count calibration circuit counts pulses 1, 2, and 3 on the receive clock (RCV CLK) signal 310 before the leading edge of drive clock (DRV CLK) signal 320 arrives (e.g., at time 370). Accordingly, the count calibration circuit determines that there is a latency of three logical clock cycles between clock domains.

Although FIG. 3 illustrates stopping the receive clock signal, waiting until the drive clock signal stops, restarting the receive clock signal, and counting the number of logical clock cycles before the leading edge of the drive clock signal arrives, other embodiments are also contemplated. In another exemplary embodiment, the number of logical clock cycles on the drive clock signal may be counted after the receive clock signal stops until the drive clock signal also stops.

FIG. 4 is a schematic diagram illustrating an exemplary count calibration circuit. Exemplary count calibration circuit 400 may be implemented as a logic circuit. For example, count calibration circuit 400 may include a number of semiconductor components, such as, e.g., Complementary Metal-Oxide Semiconductor (CMOS) transistor devices. However, it is noted that the data path circuit may also be implemented in other circuitry as will be readily apparent to one having ordinary skill in the art after becoming familiar with the teachings shown and described herein.

Exemplary count calibration circuit 400 may include a sequencer 410 for starting the count calibration circuit 400 after the edge calibration. Sequencer 410 may be implemented in latches 411-413 and a logical AND gate 415. A calibrate (CAL) signal 401 activates the sequencer 410. Sequencer 410 delays and shapes the receive clock (RCV CLK) signal 402 to a one cycle wide pulse which is issued to a stop clock circuit 420.

Shutoff circuit 420 includes a 4 bit counter implemented in toggle flip flops (T-FFs) 423-426, which change output state at the clock rising edge if input is a logic 1 (otherwise the T-FFs hold the prior state). Input to gates 421, 422 are from the outputs of T-FFs 423, 424, respectively. Shutoff circuit 420 asserts a stop clock (STP CLK) signal to stop the early domain signal (e.g., RCV CLK 402). The stop clock (STP CLK) signal is asserted until the late domain signal (e.g., DRV CLK 403) also stops, e.g., as discussed above with reference to FIG. 3. After the late domain signal stops, logical AND gate 416 and inverter 418 may be implemented (e.g., via a feedback loop from logical OR gate 427) to release the stop clock (STP CLK) signal and restart the early domain signal.

Optionally, shutoff circuit 420 may be reset via reset input 428. For example, shutoff circuit 420 may be reset to return the count calibration circuit 400 to a known state or predetermined operating conditions.

Count calibration circuit 400 may also include a count control circuit 430 to count the logical clock cycles after RCV CLK 402 is restarted until the leading edge of DRV CLK 403 arrives in the late clock domain. In an exemplary embodiment, count control circuit 430 may be implemented in a multiplexer (MUX) 431 coupled to receive input directly from logical OR gate 427 and input via latch 432 (e.g., delayed one logical clock cycle). MUX 431 selects the direct input by default, but may select input via latch 432 if the edge calibrator asserts a delay signal. For example, the edge calibrator may assert a delay signal if the RCV CLK 402 is arriving early.

Output from MUX 431 is issued to latch 433, inverter 434, and discriminator 435 to count the logical clock cycles after the receive clock (RCV CLK) signal 402 is restarted until the leading edge DRV CLK signal 403 arrives. More specifically, the initial state (e.g., at reset) of latch 433 is low. Discriminator 435 receives a signal (DRV CLK from latch 433) and a clock (RCV CLK) signal, and outputs a copy of the RCV CLK signal when the DRV CLK signal from latch 433 is low. On the first rising edge of the DRV CLK signal 403, output from latch 433 goes high and stays high. When DRV CLK signal 403 goes high, output is stopped low. Accordingly, the circuit counts every RCV CLK edge between the restarting the stopped clock signals and receipt of the first rising edge of the DRV CLK signal.

Logical AND gate 437, latch 438, and buffer 439 generate a STP CLK signal that temporarily stops the DRV CLK and RCV CLK signals for measuring the delay between clock domains, as described above with reference to the illustration in FIG. 3. An active low reset signal is input to logical AND gate 437 to keep the clock from stopping accidentally at startup when the control signal initial conditions are undetermined. Latch 438 synchronizes the STOP_CLK signal with the count circuit 440 so that the proper RCV CLK edges are counted after the STP CLK signal is de-asserted. Buffer 439 drives the STP CLK signal to the clock generator circuit.

A decoder circuit 440 may determine the latency between clock domains based on the logical clock cycles counted. Decoder circuit 440 may be implemented as a three bit counter including T-FFs 441-443 and inverters 444-446. Output from the decoder circuit 440 is issued to a data path (e.g., the data path 220 in FIG. 2) via an output circuit 450. Logical AND gate 447 forms an input for T-FF 443, implementing a counter (i.e., the bit switches state on the next rising clock are logical 1 when all the bits are lower).

Output circuit 450 issues a count (CNT) signal to the data path (e.g., data path 220 in FIG. 2) based on the count calibration. The CNT signal may be used to configure the data path for synchronous data transfer between clock domains, as described below for an exemplary embodiment.

For purposes of illustration, output circuit 450 may issue CNT signal via logical AND gate 451 if there is an invalid count. For example, there may be a hardware problem if 6 or 7 clock cycles pass before the leading edge of DRV CLK 403 arrives. Accordingly, the CNT signal shuts off or otherwise deactivates the data path for troubleshooting.

Alternatively, output circuit 450 may issue CNT signal via logical AND gate 452 and inverter 452a. For example, the CNT signal may be used to configure the data path with zero delay if there is a logical count of five cycles.

Alternatively, output circuit 450 may issue CNT signal via logical AND gate 453 and inverter 453*a*. For example, the CNT signal may be used to configure the data path with a one clock cycle delay if there is a logical count of four cycles.

Alternatively, output circuit 450 may issue CNT signal via logical AND gate 454 and inverter 454*a*. For example, the CNT signal may be used to configure the data path with a two clock cycle delay if there is a logical count of three cycles.

Alternatively, output circuit 450 may issue CNT signal via logical AND gate 455 and inverter 455*a*. For example, the CNT signal may be used to configure the data path with a three clock cycle delay if there is a logical count of two cycles.

Alternatively, output circuit 450 may issue CNT signal via logical AND gate 456 and inverter 456*a*. For example, the CNT signal may be used to configure the data path with a four clock cycle delay if there is a logical count of one cycles.

Alternatively, output circuit 450 may issue CNT signal via logical AND gate 457, logical OR gate 457*a*, and inverter 457*b* to configure the data path with a zero clock cycle delay if there is a count of zero logical clock cycles. Logical OR gate 457*a* is implemented for calibrate cycle counts of 6 and 7 to force a calibration delay of 5 logical clock cycles because, in this exemplary embodiment, count calibration is only implemented for data path delays of 0 to 5 logical clock cycles. It is noted, however, that other embodiments may be implemented where calibration delays greater than 5 are implemented.

As noted above, the exemplary embodiments shown and described are provided for purposes of illustration. Still other embodiments are also contemplated.

Exemplary Operations

FIG. 5 is a flowchart illustrating exemplary operations to implement count calibration for synchronous data transfer between clock domains. As noted above, logic circuitry may be provided to execute operations 500. In an exemplary embodiment, the components and connections depicted in the figures may be used to implement count calibration for synchronous data transfer between clock domains. It is also contemplated that in other embodiments, operations shown and described herein may be implemented as logic instructions (or software) for execution by a processor or processing units, e.g., for circuit modeling using computer devices.

In operation 510, an early domain clock signal is stopped. In operation 520, a determination is made whether a late domain clock signal has also stopped. Operations wait for the late domain clock signal to stop, as illustrated by the return path 530.

If the late domain clock signal has stopped, as illustrated by path 540, operations continue. In operation 550, the early domain clock signal is restarted. In operation 560, the logical clock cycles of the early domain clock signal are counted until the late domain clock signal arrives.

In operation 570, the data path is configured. In an exemplary embodiment, the data path may be configured based at least in part on the count calibration, e.g., the latency between clock domains as determined in operations 510-560.

The operations shown and described herein are provided to illustrate exemplary implementations of count calibration for synchronous data transfer between clock domains. For example, counting operations 560 may be implemented after stopping the early domain clock signal (operation 510) until the late domain clock signal also stops. Still other operations may also be implemented to enable count calibration for synchronous data transfer between clock domains.

In addition to the specific embodiments explicitly set forth herein, other aspects will be apparent to those skilled in the art from consideration of the specification disclosed herein. It is intended that the specification and illustrated embodiments be considered as examples only, with a true scope and spirit of the following claims.

The invention claimed is:

1. A system for synchronous data transfer between clock domains, comprising:
    a count calibration circuit for determining logical clock cycle latency between an early clock domain and a late clock domain, the count calibration circuit comprising:
        a shutoff circuit asserting a stop clock signal to stop a clock generator in the early clock domain; and
        a count control circuit to restart the clock generator in the early clock domain, the count control circuit counting logical clock cycles to determine latency; and
    a data path configurable for synchronous data transfer between clock domains based at least in part on the latency.

2. The system of claim 1 wherein the shutoff circuit waits for a control signal generator to stop in the late clock domain before restarting the clock generator in the early clock domain.

3. The system of claim 1 wherein the count control circuit counts logical clock cycles between a receive clock signal in the early clock domain and a drive clock signal in the late clock domain.

4. The system of claim 1 further comprising a decoder circuit converting counted logical clock cycles into latency between the early clock domain the late clock domain.

5. The system of claim 1 further comprising:
    the shutoff circuit stopping a receive clock signal in the early clock domain, the shutoff circuit waiting until a drive clock signal stops in the late clock domain before restarting the receive clock signal; and
    the count control circuit counting logical clock cycles on the receive clock until a leading edge of the drive clock signal arrives.

6. The system of claim 5 further comprising a decoder circuit determining latency between the early clock domain the late clock domain based on the logical clock cycles counted by the count control circuit.

7. The system of claim 5 further comprising an output circuit issuing a first count signal to configure the data path for synchronous data transfer between clock domains.

8. The system of claim 7 wherein the output circuit issues a second count signal to shut off the data path in response to an invalid count.

9. A method of count calibration for synchronous data transfer between clock domains, comprising:
    determining logical clock cycle latency between an early clock domain a late clock domain by stopping a clock generator in the early clock domain and then restarting the clock generator and counting logical clock cycles after restarting the receive clock signal until a drive clock signal arrives; and
    configuring a data path for synchronous data transfer between clock domains based at least in part on the latency.

10. The method of claim 9 further comprising converting logical clock cycles between the early clock domain and the late clock domain to determine latency.

11. The method of claim 9 further comprising:
    after stopping said clock generator in the early clock domain;
    waiting for a control signal generator to stop in the late clock domain; and
    restarting the clock generator to determine latency.

12. The method of claim 9 further comprising:
stopping a receive clock signal in the early clock domain;
waiting for the drive clock signal to stop in the late clock domain; and
restarting the receive clock signal to determine latency.

13. The method of claim 12 further comprising counting logical clock cycles on the receive clock signal after restarting the receive clock signal until a leading edge of the drive clock signal arrives.

14. The method of claim 13 further comprising shutting off the data path in response to an invalid count.

15. An configurable data path system, comprising:
means for stopping a receive clock signal in an early clock domain;
means for waiting until a drive clock signal stops in a late clock domain;
means for restarting the receive clock signal; and
means for counting logical clock cycles until a leading edge of the drive clock signal arrives for determining latency between the early clock domain and late clock domain.

16. The system of claim 15 further comprising means for configuring a data path for synchronous data transfer between clock domains based at least in part on the latency.

17. The system of claim 15 further comprising means for converting counted logical clock cycles into latency.

* * * * *

UNITED STATES PATENT AND TRADEMARK OFFICE
CERTIFICATE OF CORRECTION

PATENT NO. : 7,401,245 B2 Page 1 of 1
APPLICATION NO. : 11/118600
DATED : July 15, 2008
INVENTOR(S) : Timothy C. Fischer et al.

It is certified that error appears in the above-identified patent and that said Letters Patent is hereby corrected as shown below:

In column 2, line 3, delete "a least" and insert -- at least --, therefor.

In column 8, line 29, in Claim 4, delete "domain the" and insert -- domain and the --, therefor.

In column 8, line 39, in Claim 6, after "domain" insert -- and --.

Signed and Sealed this

Seventh Day of October, 2008

JON W. DUDAS
*Director of the United States Patent and Trademark Office*